(12) United States Patent
Lo et al.

(10) Patent No.: US 9,683,591 B2
(45) Date of Patent: Jun. 20, 2017

(54) PLASTIC LINING FASTENERS

(71) Applicants: LISI AEROSPACE, Paris (FR); THE MONADNOCK COMPANY, City of Industry, CA (US)

(72) Inventors: Justin Lo, Irvine, CA (US); Michael Reyes, West Covina, CA (US)

(73) Assignee: The Monadnock Company, City of Industry, CA (US)

( * ) Notice: Subject to any disclaimer, the term of this patent is extended or adjusted under 35 U.S.C. 154(b) by 0 days.

(21) Appl. No.: 14/723,423

(22) Filed: May 27, 2015

(65) Prior Publication Data
US 2016/0348708 A1 Dec. 1, 2016

(51) Int. Cl.
*F16B 19/00* (2006.01)
*F16B 21/08* (2006.01)
*F16B 5/06* (2006.01)

(52) U.S. Cl.
CPC .......... *F16B 21/084* (2013.01); *F16B 5/0642* (2013.01); *F16B 21/082* (2013.01); *F16B 21/086* (2013.01)

(58) Field of Classification Search
CPC ........ F16B 5/0642; F16B 5/065; F16B 19/00; F16B 19/002; F16B 19/004; F16B 21/08; F16B 21/084; F16B 21/086
USPC ......................................... 411/508–509, 510
See application file for complete search history.

(56) References Cited

U.S. PATENT DOCUMENTS

| | | | | |
|---|---|---|---|---|
| 3,966,339 A | * | 6/1976 | Nemecek | F16B 12/24 403/292 |
| 4,454,699 A | * | 6/1984 | Strobl | F16B 21/082 403/298 |
| D293,880 S | * | 1/1988 | Takahashi | 174/138 D |
| 4,963,051 A | * | 10/1990 | Hutter | F16B 2/18 403/298 |
| 5,306,098 A | | 4/1994 | Lewis | |
| 5,685,682 A | * | 11/1997 | Glime | F16B 21/082 411/510 |
| 6,176,662 B1 | * | 1/2001 | Champney | F16B 19/1045 411/171 |
| 6,442,806 B1 | * | 9/2002 | Wesson | F16B 2/06 24/16 PB |
| 7,264,431 B2 | * | 9/2007 | Trueb | F16B 21/082 411/455 |
| 7,658,583 B2 | * | 2/2010 | Homner | F16B 5/0642 411/510 |

(Continued)

OTHER PUBLICATIONS

Pirog, Pawel, European Search Report, Oct. 11, 2016, 6 pages, European Patent Office.

*Primary Examiner* — Roberta Delisle
(74) *Attorney, Agent, or Firm* — Henricks, Slavin & Holmes LLP (57) ABSTRACT

A fastener is formed monolithically, or as a one-piece structure, for example 100% plastic. The fastener includes a body having first and second portions on respective sides of a positioning wall or stop means. A first portion includes a plurality of compressible retention surfaces separated from adjacent retention surfaces by a corresponding conical structure and a cylindrical surface on the body. A second portion includes a plurality of resiliently flexible tongues spaced apart from each other. The tongues may be positioned on opposite sides of the body from each other, and/or at different axial positions along the body.

17 Claims, 7 Drawing Sheets (56) References Cited

U.S. PATENT DOCUMENTS 7,950,889 B2 * 5/2011 Homner ............... F16B 5/0642
                                                                           411/510
8,511,962 B2 * 8/2013 Schuech ............... F16B 21/082
                                                                           411/388

* cited by examiner

PLASTIC LINING FASTENERS

BACKGROUND

Field

This relates to fasteners for liners and blankets for structures, for example for stringers on aircraft.

Related Art

In aircraft construction, insulating layers may be secured on two walls using connection elements in the form of a pin. The pin has a head, engaging positions and a retaining element. In an example illustrated in Homner, U.S. Pat. No. 7,950,889, such a fastener includes a skeleton and an outer material where the skeleton is more resistant to heat than the outer material. The fastener includes groove-shaped engaging positions having a saw-tooth shaped outer contour in longitudinal cross-section. A flange divides the pin into two parts, and retaining discs hold the insulating layers in place. The flange is held in position by a supporting element projecting obliquely from the pin.

SUMMARY

Apparatus are described for fastening or securing sheets of material, for example blankets or liners onto structures, for example onto aircraft stringers and other support structures. In one example, a monolithic or one-piece structure is formed from a plastic material, and extends longitudinally. The structure includes a body having a first portion and a second portion on respective sides of a wall or positioning or stop means. The first portion includes a plurality of circumferentially extending stop surfaces or retention surfaces positioned with respect to each other axially along the first portion. In one example, there are four retention surfaces. In another example, each retention surface is substantially flat and perpendicular to a longitudinal axis of the body and forms an end surface for a conical-shaped structure. The second portion of the body includes at least first and second tabs, tongues or flaps extending, when in a relaxed configuration, outwardly from the body. In one example, each of the tongues has an identical geometry. In a further example, each of the tongues extends from the body at an angle when in a relaxed configuration. In a further example, each of the tongues has a magnitude of angle that is the same as that of the other relative to the body, but in different directions. For example, they diverge away from each other but in the same axial direction, such as by being attached to the body at points 180° apart, or on opposite sides of the body. In another example, the first tongue is positioned closer to the wall or stop means than the second tongue. In a further example, the first and second tongues are positioned axially along the body relative to a longitudinal axis and their axial positions are separated by an amount less than a length of a tongue. In side profile, they overlap.

In a further example of a fastener, for example a fastener for a lining or a blanket, the fastener is formed monolithically, or as a one-piece structure. The fastener is 100% plastic, for example all nylon, such as nylon 6/6. The fastener includes a body having first and second portions on respective sides of a positioning wall or stop means. A first portion includes a plurality of retention surfaces, and in one example they are compressible conical geometries positioned longitudinally of a body of the fastener with respect to each other. Each of the retention surfaces is separated from adjacent retention surfaces by a corresponding conical structure and a cylindrical surface on the body. In one example, there are four retention surfaces on the first portion. The second portion includes resiliently flexible tongues spaced apart from each other. In one example, the tongues are positioned on opposite sides of the body from each other. In another example, the tongues are positioned at different axial positions along the body. In a further example, a first flexible tongue is positioned closer to the wall or stop means than other flexible tongues, and has a free end of the tongue spaced a distance from the adjacent surface of the wall or stop means less than a length of the first flexible tongue. There may be two or three or more flexible tongues on a given fastener, and each may be oriented circumferentially on opposite sides of the fastener from an adjacent tongue.

In any of the foregoing examples of a fastener, the second portion includes resiliently flexible tongues spaced apart from each other. In one example, the fastener is intended to be placed, and will be placed, in an intended panel or structure to form an assembly of a panel and one or more of the fasteners described herein, in such a configuration that the at least one of the tongues is positioned at least partly within an opening in the panel or structure, when the wall or stop means contacts a surface of the panel or structure. In another configuration, a plurality of tongues are positioned at least partly within an opening in the panel or structure when the wall or stop means contacts the surface of the panel structure.

These and other examples are set forth more fully below in conjunction with drawings, a brief description of which follows.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of lining fasteners are described. Depending on what feature or features are incorporated in a given structure, benefits can be achieved in the structure. For example, lining fasteners using a plurality of tongues may result in a more secure installation under normal operating conditions. They may also provide more flexibility in assemblies calling for such fasteners. Additionally, some lining fastener configurations may also be lighter-weight, and lower-cost.

These and other benefits will become more apparent with consideration of the description of the examples herein. However, it should be understood that not all of the benefits or features discussed with respect to a particular example must be incorporated into a lining fastener in order to achieve one or more benefits contemplated by these examples. Additionally, it should be understood that features of the examples can be incorporated into a lining fastener to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of lining fastener configurations are described herein, and some have particular benefits in being used together. However, even though these apparatus and methods are considered together at this point, there is no requirement that they be combined, used together, or that one component or method be used with any other component, or combination. Additionally, it will be understood that a given component could be combined with other structures not expressly discussed herein while still achieving desirable results.

It should be understood that terminology used for orientation or clarity, such as front, rear, side, left and right, upper and lower, first and second, and the like, are used herein merely for ease of understanding and reference, and are not used as exclusive terms for the structures being described and illustrated.

A monolithic plastic stud is described (FIGS. 1-6) that is lightweight, easy to manufacture or mold, and that provides flexibility in use, for example as a fastener for securing lining blankets to a structure, for example to an aircraft stringer. In one example, a monolithic plastic stud in the form of a lining fastener 20 (FIGS. 1-3) is formed as a single piece, and completely of a single material. In one example, the material is nylon, which may be nylon 6/6. There is no metal skeleton or other skeleton formed from another material.

Figure 1:
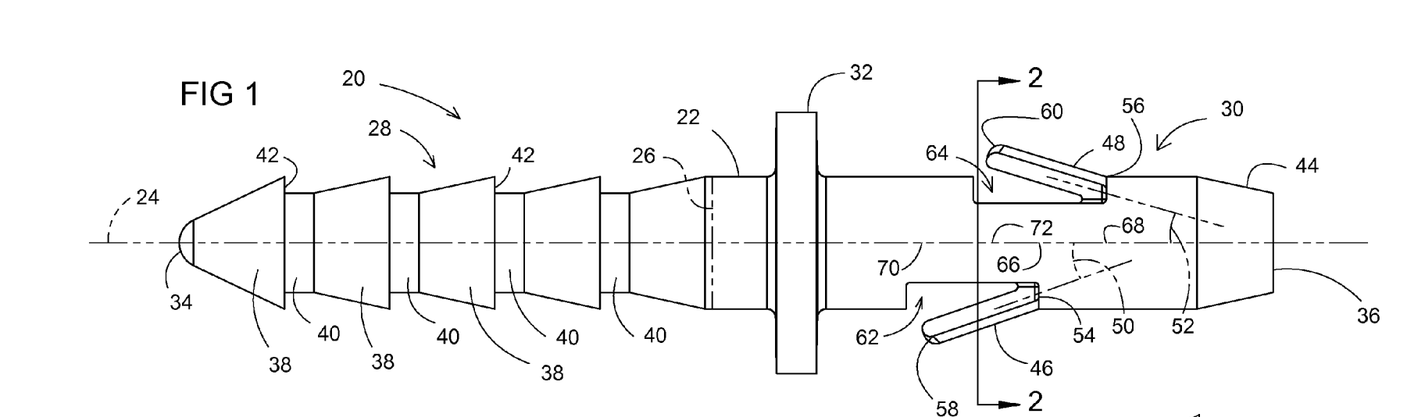
FIG. 1 is a side elevation view of an exemplary form of a fastener stud, for example for use in securing a lining blanket on a stringer with stop discs.

The lining fastener 20 includes a body 22 extending longitudinally, for example along a longitudinal axis 24. The body extends substantially straight, centered on the longitudinal axis 24, but it should be understood that the lining fastener may be more or less laterally flexible based on the material properties and length. The body 22 has an overall outer diameter 26, but the lining fastener includes other geometries, which other geometries will be described with reference to the body 22.

The body 22 includes a first portion 28, a second portion 30 and a stop means or positioning means, in the present example in the form of a wall 32 extending radially outward from the body 22. The stop means can alternatively be in the form of radially extending fingers, protrusions, or other structures. In the present example, the wall 32 is described for purposes of reference as separating the first and second portions from each other. The wall 32 is substantially circular in transverse cross-section. The wall serves as a backstop or contact member for helping to position the lining fastener in an opening in a stringer, in which the lining fastener is inserted and the wall comes into contact with the stringer surrounding the opening. The first portion 28 extends longitudinally from the wall 32 to a first end 34, and the second portion 30 extends longitudinally in a direction opposite the first portion to a second end 36.

The body 22 has a cylindrical form adjacent the wall 32, and extends longitudinally away from the wall. The body includes a plurality of compressible or resiliently flexible retaining elements 38 on the first portion of the body. The retaining elements 38 are spaced apart longitudinally relative to each other. In the present example, adjacent retaining elements 38 are separated or spaced from each other by respective cylindrical portions 40 on the body 22. The retaining elements 38 have maximum outside diameters as shown in FIG. 1 substantially equal to the outside diameter of the body 22. The cylindrical portions 40 have respective outside diameters that are equal to each other, but less than the outside diameter of the body portion 22. In the illustrated examples, the retaining elements 38 have frustoconical geometries, with substantially flat, transversely-extending retaining walls 42 with substantially straight converging sidewalls, converging in a direction away from the wall 32 to the respective cylindrical portion 40 on the body. The converging sidewalls converge inwardly to a diameter substantially equal to the diameter of the cylindrical portions 40. Alternatively, the converging sidewalls can be curved. In the illustrated example, the first portion has four retaining elements 38, each with corresponding retaining walls 42. The retaining element 38 terminating at the first end 34 has an angle of convergence with a steeper slope than that of the other retaining elements 38.

The lateral walls of the retaining elements are compressible inwardly in the direction of the central longitudinal axis 24, for example to allow a disc having an opening smaller than the maximum outside diameter of the retaining element to pass over the retaining element, while still being able to flex outwardly after the disc passes the retaining wall 42.

The second portion 30 extends longitudinally from the wall 32 in a direction opposite the first portion 28, with most of the body having an outside diameter substantially the same as the outside diameter 26 described with respect to the first portion. The second portion converges to the second end 36 along a frustoconical portion 44.

The second portion includes a plurality of tabs, flaps or tongues, in the present examples first and second tongues 46 and 48, respectively. The first and second tongues are resiliently flexible and compressible, and in their relaxed state, extend at respective angles 50 and 52 to the longitudinal axis 24. Each of the tongues extends outwardly in a direction away from the body and longitudinally in the direction of the wall 32. Each of the first and second tongues extend from a respective first and second junction elements 54 and 56 to respective ends 58 and 60. The free ends of the tongues are movable toward the longitudinal axis and the body of the lining fastener. Each can be pressed or flexed into respective cavities 62 and 64 formed in the circumferential surface of the body 22. The first and second tongues are spaced apart from each other, in the present examples both longitudinally and circumferentially.

In the illustrated configuration, the first tongue 46 extends from the body at the junction area 54 at a first axial or longitudinal position 66, and the second tongue 48 extends at an angle from the body at a junction 56 at a second longitudinal position 68 spaced from the wall 32 further than the first axial position 66 of the first junction 54. Therefore, the first and second tongues extend angularly from the body 20 from different positions along the longitudinal axis. In the present examples, the first and second tongues have substantially identical lengths, and therefore terminate at different axial positions along the body, though their lengths can be different as desired. "Substantially" as used herein is taken to mean plus or minus 10% of the value or parameter identified. The free end 58 of the first tongue terminates at a third longitudinal position 70, and the free end 60 of the second tongue terminates at a fourth longitudinal position 72 further from the wall 32. In the illustrated examples, the free end 60 of the second tongue 48 terminates at an axial position, when in its free state, that is intermediate the first and third axial positions 66 and 70, respectively. Such a configuration has the second tongue 48 overlapping the first tongue 46, when viewed in a side elevation view of the fastener such as that shown in FIG. 1. In the illustrated examples, the first and second tongues are positioned on the body diametrically opposite each other.

Other than relative positions on the second portion 30 of the body 22, the tongues 46 and 48 and their corresponding cavities 62 and 64 are substantially identical to each other. Therefore, only one tongue and cavity will be described in detail.

Figure 2:
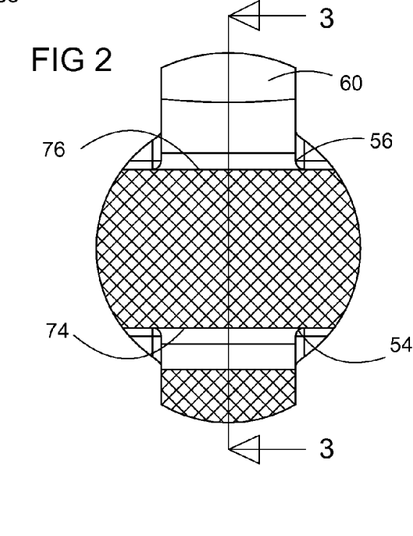
FIG. 2 is a transverse cross-sectional view of the fastener of FIG. 1 taken along line 2-2.
Figure 3:
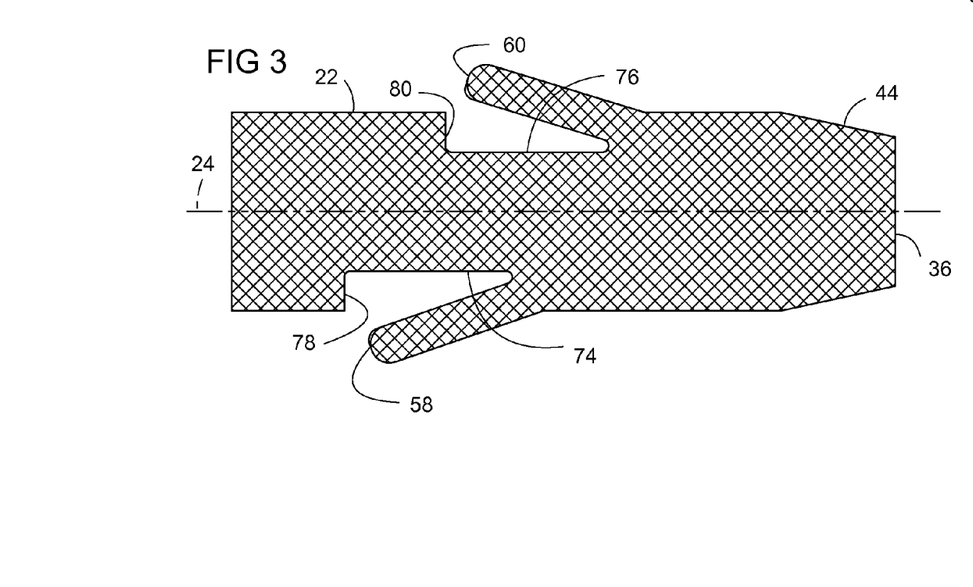
FIG. 3 is a partial longitudinal cross-section of a portion of the fastener of FIG. 1 taken along line 3-3 of FIG. 2.
Figure 4:
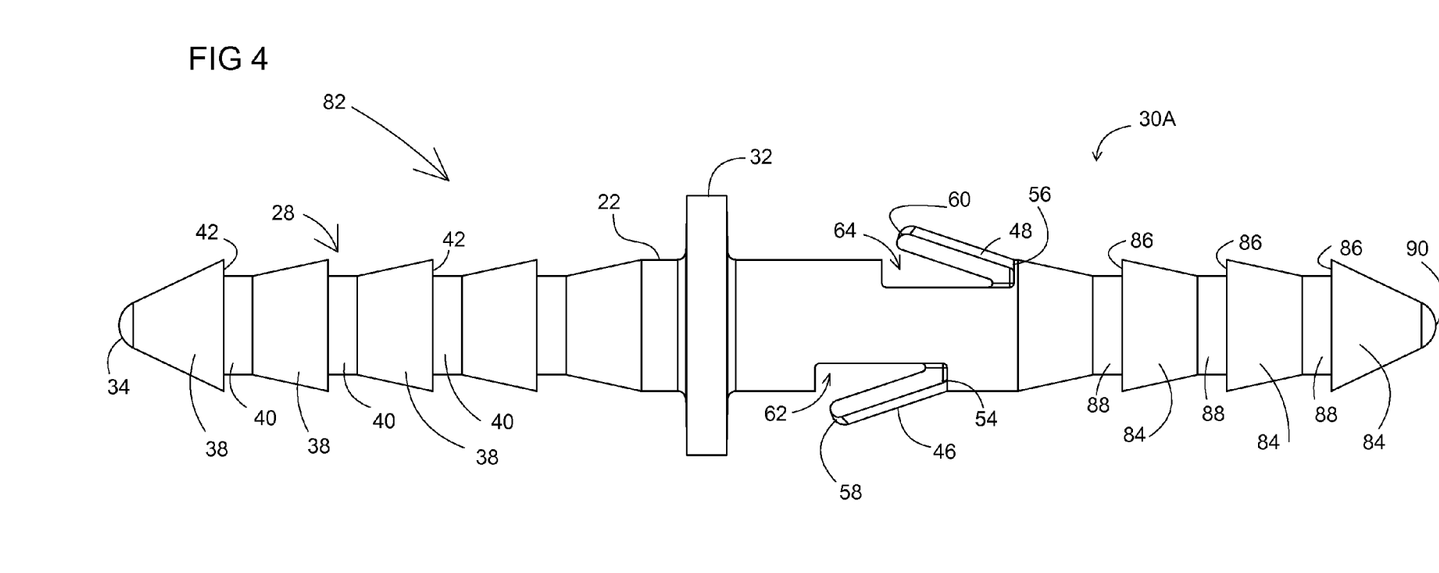
FIG. 4 is a side elevation view of another exemplary form of a fastener stud.
Figure 5:
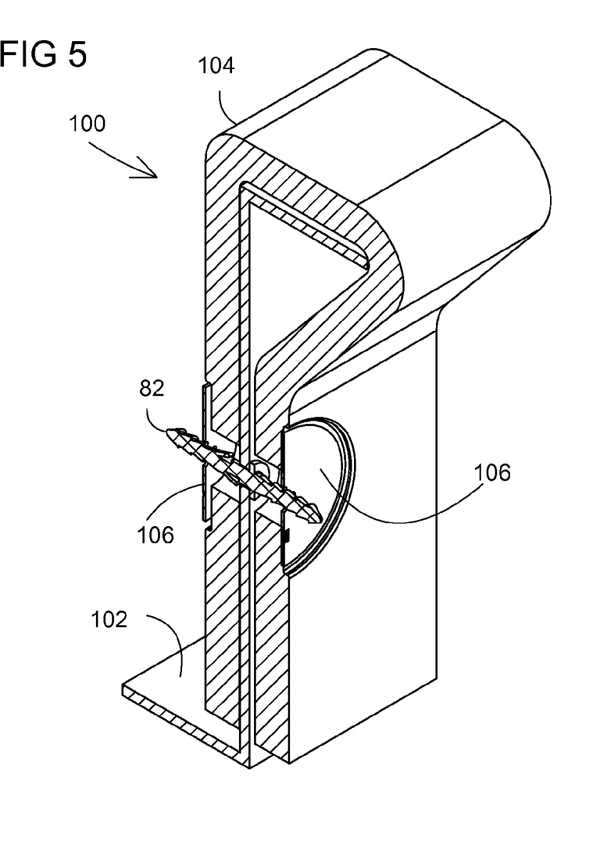
FIG. 5 is an upper isometric and transverse cross section of a stringer, for example an aircraft stringer, a lining blanket, a fastener stud such as that shown in FIG. 4, and stop discs.

Each cavity extends laterally of the body across a flat surface, 74 and 76 respectively (FIGS. 2-3). Each cavity begins where the respective tongue joins the body at the respective junction, and extends in the axial direction in the direction of the wall 32 to first and second transverse cavity walls 78 and 80, respectively. The walls 78 and 80 extend laterally the extent of each cavity and substantially perpendicular to the walls 74 and 76, respectively. The depth of each cavity is approximately the same as the thickness of the tongue at the same radial position about the body, except for mold variations. Consequently, the flexible tongue can be pressed into the cavity so that the outside diameter with a tongue compressed is approximately the same as the outside diameter 26 of the body 22. However, because the tongues are resiliently flexible, a compressed tongue will have a return force developed into the tongue tending to push the tongue outward of the cavity.

Each tongue 46 and 48 has a respective convex outer surface, approximating the curvature of the body (FIG. 2). The side surfaces of the tongue are substantially straight and extend along a chord (for example as viewed in FIG. 2), and the interior surfaces facing the flat surface of the corresponding cavity are straight and extend laterally for much of the surface facing the cavity. However, as shown in FIG. 2, the interior end surface of the second tongue is slightly convex as the tongue terminates at the end surface 60. The first tongue 46 has the same geometry in the illustrated examples.

In another example of a lining fastener, a lining fastener 82 (FIG. 4) can have first and second portions identical to those described above with respect to the one-sided lining fastener 20 in FIGS. 1-3, and components in the lining fastener 82 identical to those in the lining fastener 20 have identical reference numbers, structures and functions. Each of the retaining elements 84 are substantially identical to the retaining elements 38 on the first portion 28, except that the second retaining elements 84 are oriented in the opposite direction. Specifically, each of the second retaining elements are substantially frustoconical in geometry, and converge from respective retaining surfaces 86, extending transversely of the body, in a direction away from the wall 32 to respective cylindrical body surfaces 88. In the illustrated example, the second portion 30A includes three retaining elements 84, terminating at a second end 90. Either of the lining fastener configurations described herein can have more than two tongues, adjacent ones being spaced apart from each other.

In one example of an application the lining fasteners described herein, such as that described with respect to lining fastener 82, an assembly 100 includes a stringer 102, stringers being conventional in such assemblies as aircraft and the like. A lining blanket 104 is positioned and extends along the stringer 102, and in the present example on both sides of the stringer 102. The lining fastener 82 is a double lining fastener, and supports and retains a pair of retaining discs 106. One retaining disc is retained on the first portion of the lining fastener 82 by tabs or other projections on the disc (not visible in FIG. 6) contacting and being retained by an adjacent retaining wall 42, and the other retaining disc 106 retained on the second portion of the lining fastener (FIG. 6) by tabs or other projections on the disc (not visible in FIG. 6) contacting and being retained by an adjacent retaining wall 86. The retaining discs are retained on the lining fastener in a manner similar to conventional lining fastener and disc assemblies. In an example of an assembly in which a lining blanket extends along only one side of the stringer 102, a one-sided lining fastener such as lining fastener 20 can be used to secure the lining blanket with a corresponding retaining disc 106.

Figure 6:
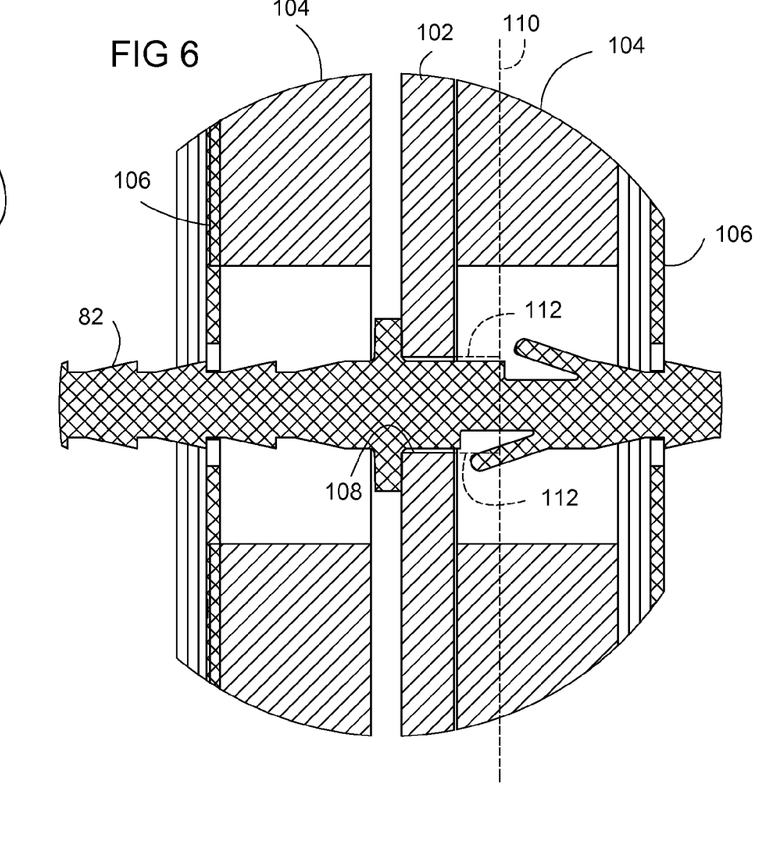
FIG. 6 is a detailed elevation view of a portion of the assembly of FIG. 5.

The lining fastener 82 (and similarly with the lining fastener 20 in a similar assembly) is inserted into an opening 108 in the stringer (FIG. 6). The lining fastener is inserted into and partly through the opening. As the lining fastener is inserted into the opening 108, the second and then the first tongues are compressed or depressed into their respective cavities so that the body and the tongues fit within the inside diameter of the opening 108. As the lining fastener progresses through the opening, the second tongue 48 exits the opening and flexes outwardly. Thereafter, with further progress of the lining fastener into the opening, the first tongue 46 becomes free of the opening and flexes outwardly to the configuration shown in FIG. 6. The lining fastener progresses further into the opening until the wall 32 contacts the facing surface of the stringer. In an example where the thickness of the stringer is less than the spacing, in the relaxed configuration, between the free end 58 of the first tongue 46 and the facing surface of the wall 32, the first and second tongues will be free of the opening and extend outwardly from the body to take their relaxed configuration when the wall 32 is contacting the stringer. In this configuration, the lining fastener has been retained in the opening of the stringer, the wall 32 serving to stop the further progress of the lining fastener into the opening. The first tongue 46 helps to retain the lining fastener in the opening, and prevents the lining fastener from being withdrawn out of the opening.

In another configuration, in an example of a stringer having a greater thickness, for example a thickness greater than the distance, in the relaxed state, from the facing surface of the wall 32 to the free end 58 of the first tongue, but less than the distance to the free end 60 of the tongue 48, insertion of the lining fastener into an opening in such a thicker stringer would allow the second tongue to exit free of the opening, while leaving the first tongue still within the opening. In such a configuration, the first tongue 46 would be tending to flex outward and make contact with the interior wall of the opening, represented at 112, and bias the body of the lining fastener in the opposite direction and against the opposite wall of the opening 112. The lateral contact and loading by the tongue against the interior wall of the opening 112 helps to stabilize the lining fastener in the stringer. Therefore, in the illustrated example in FIG. 6, the lining fastener 82 has the first and second tongues configured so that for one panel, the first tongue 46 is exterior to the opening 108 and helps to position the fastener within the opening along with the wall 32, and for another panel the first tongue 46 can be positioned at least partly within the opening 108, while the second tongue 48 helps to position the fastener within the opening along with the wall 32.

In a further example of a lining fastener, a lining fastener 120 includes a tab, tongue or flap such as tongue 122 on a second portion 30B of the lining fastener and positioned in such a way relative to the wall 32 that at least a portion of the tongue contacts the interior or the inside surface of the hole through the stringer for any foreseeable stringer thickness (FIGS. 7-10). In the present example, the fastener is described in the context of a double fastener, with the elements that are the same structures and functions as for the fastener 82 (FIG. 4) having the same reference numbers. These elements will not be described further. However, it is understood that while an interior tongue 122 is described on a fastener having first and second tongues 46 and 48, respectively, it is contemplated that such a fastener as fastener 120 illustrated in FIG. 7 can be configured to have an interior tongue 122 and only one other tongue, for example either the first tongue 46 or the second tongue 48. The interior tongue 122 and another tongue can be oriented on the body and a number of ways, including aligned as the interior tongue 122 and the second tongue 48, diametrically opposite as the first tongue 46, or otherwise. When first and second tongues are configured other than as aligned, the tongues can be configured so as to overlap at least partially if desired. It is also understood that an interior tongue such as tongue 122 can be configured on a single lining fastener such as that described above with respect to FIGS. 1-3, the retaining elements 84 not being essential for acceptable functioning of the interior tongue 122. However, the structure and function of the interior tongue 122 will be described in the context of a double fastener such as that illustrated in FIG. 7.

Figure 7:
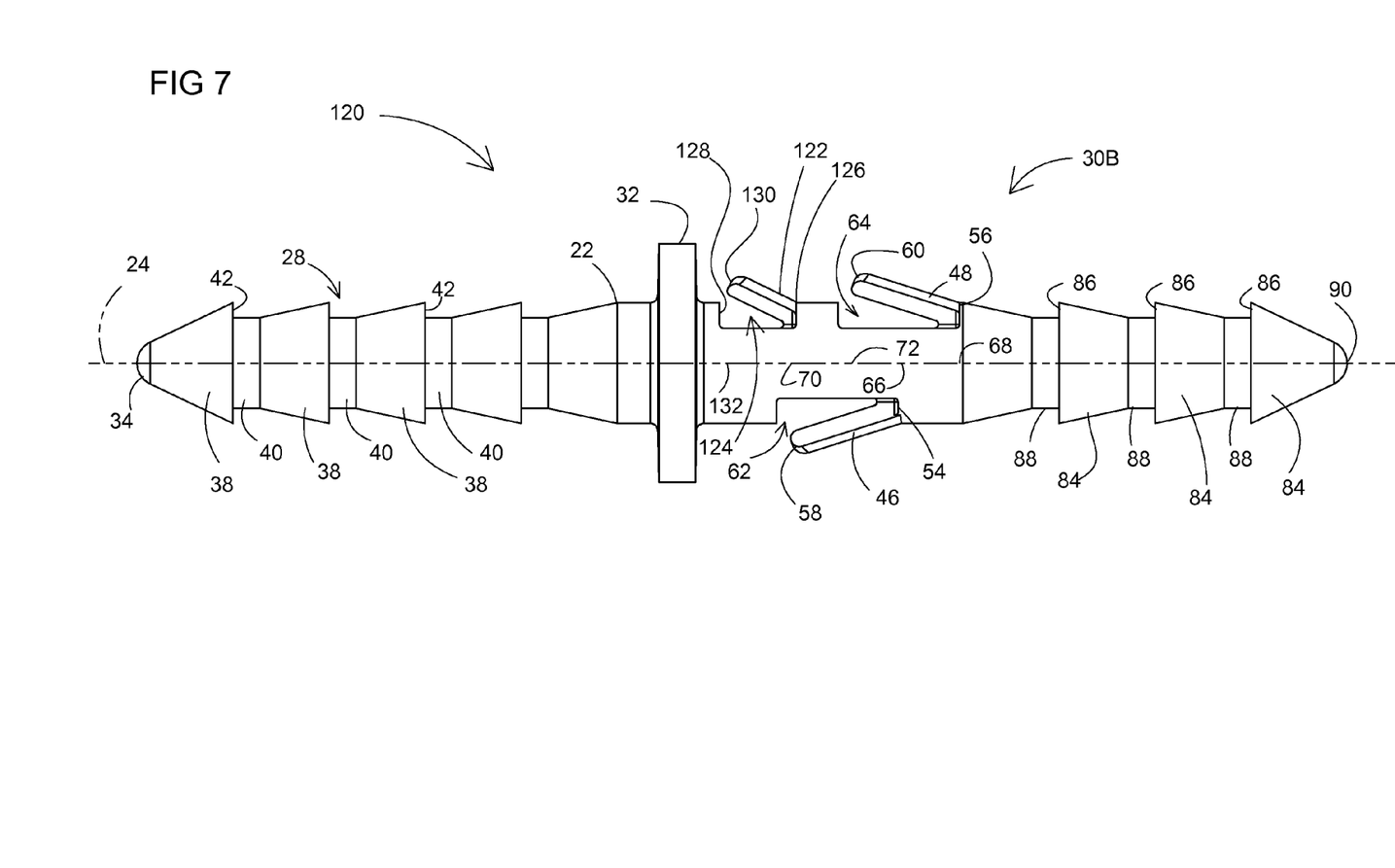
FIG. 7 is a side elevation view of another exemplary form of a fastener stud.

In the present example, the interior tongue 122 has the same geometry as the first tongue 46, and may be configured to extend at an angle to the longitudinal axis of the fastener the same as the angle of the second tongue 48. However, the angle can be greater, for example to increase the load applied by the interior tongue 122 against the interior of the opening in the stringer. In FIG. 7, the interior tongue 122 forms an angle to the longitudinal axis greater than that for the second tongue 48. The interior tongue angle can be as high as 90°, and possibly greater, depending on the size of the stringer openings, the geometry and dimensions of the tongue and the fastener body, and the like. For example, a shorter interior tongue can be configured to have a higher angle, while a longer interior tongue can be configured to have a smaller angle.

As illustrated, the interior tongue 122 and the second tongue 48 are substantially aligned. However, they can be otherwise. For example, in a configuration having three tongues, the tongues can be arranged circumferentially around the body equidistant from each other, such as if such a configuration can be feasibly molded.

The interior tongue 122 extends outwardly from a corresponding cavity 124 formed in the body 22. The interior tongue joins the body at a junction 126 in an area that forms one end of the cavity 124. The other end of the cavity is defined by a substantially transverse wall 128, adjacent the wall 32. In some configurations, the transverse wall 128 can be approximately flush with the adjacent surface of the wall 32, subject to molding or other material considerations.

In the illustrated example, the junction 126 is positioned axially on the side of the point 70 opposite the wall 32. In other words, the interior tongue 122 joins the body at a point between the points 66 and 70 corresponding to the beginning and end locations on the axis 24 of the first tongue 46. However, it should be understood that the junction 126 can be positioned axially between the point 70 and the adjacent surface of the wall 32.

The interior tongue 122 extends toward the adjacent surface of the wall 32, at an acute to the longitudinal axis in the illustrated configuration, out of the cavity 124. The interior tongue extends to a free end 130, terminating at a point 132 along the axis 24. The location and the length of the tongue are selected so that at least part of the tongue will be interior to the opening of a panel into which the fastener is inserted. The spacing from the adjacent surface of the wall 32 to the point 132 on the axis is configured to be less than the expected width of the panel into which the fastener is inserted. For example, if a fastener is rated or specified for a given panel thickness or a range of panel thicknesses, the spacing from the adjacent surface of the wall 32 to the point 132 is selected to be less than the panel thickness for which the fastener is intended to be used. In one configuration of the present fasteners, either a single fastener or a double fastener, the configuration of the interior tongue 122 has at least half of the interior tongue 122 axial length within the panel opening. In some configurations, the free end 130 of the interior tongue can be closely adjacent the adjacent surface of the wall 32, for example within approximately a millimeter.

With an interior tongue 122, the lining fastener 120 can be used with a variety of panel thicknesses, and the interior tongue can help to stabilize the lining fastener in the opening of the panel, for example by applying a lateral load to an interior wall of the panel. For a relatively thin panel, such as panel 102A (FIG. 8), the fastener can be inserted into the panel opening 108A until the fastener stop wall 32 contacts the adjacent surface of the panel. The first and second tongues 46 and 48, respectively, as completely through the opening 108A while the interior tongue 122 has at least a portion interior to the opening and contacting the interior surface, or at least the rim, of the opening 108A. While the lining fastener 120 can still move longitudinally within the opening, the first tongue 46 limits the longitudinal motion. Additionally, the interior tongue 122 limits the lateral motion of the fastener in the opening compared to a fastener configuration without a flexible tongue within the panel.

Figure 9:
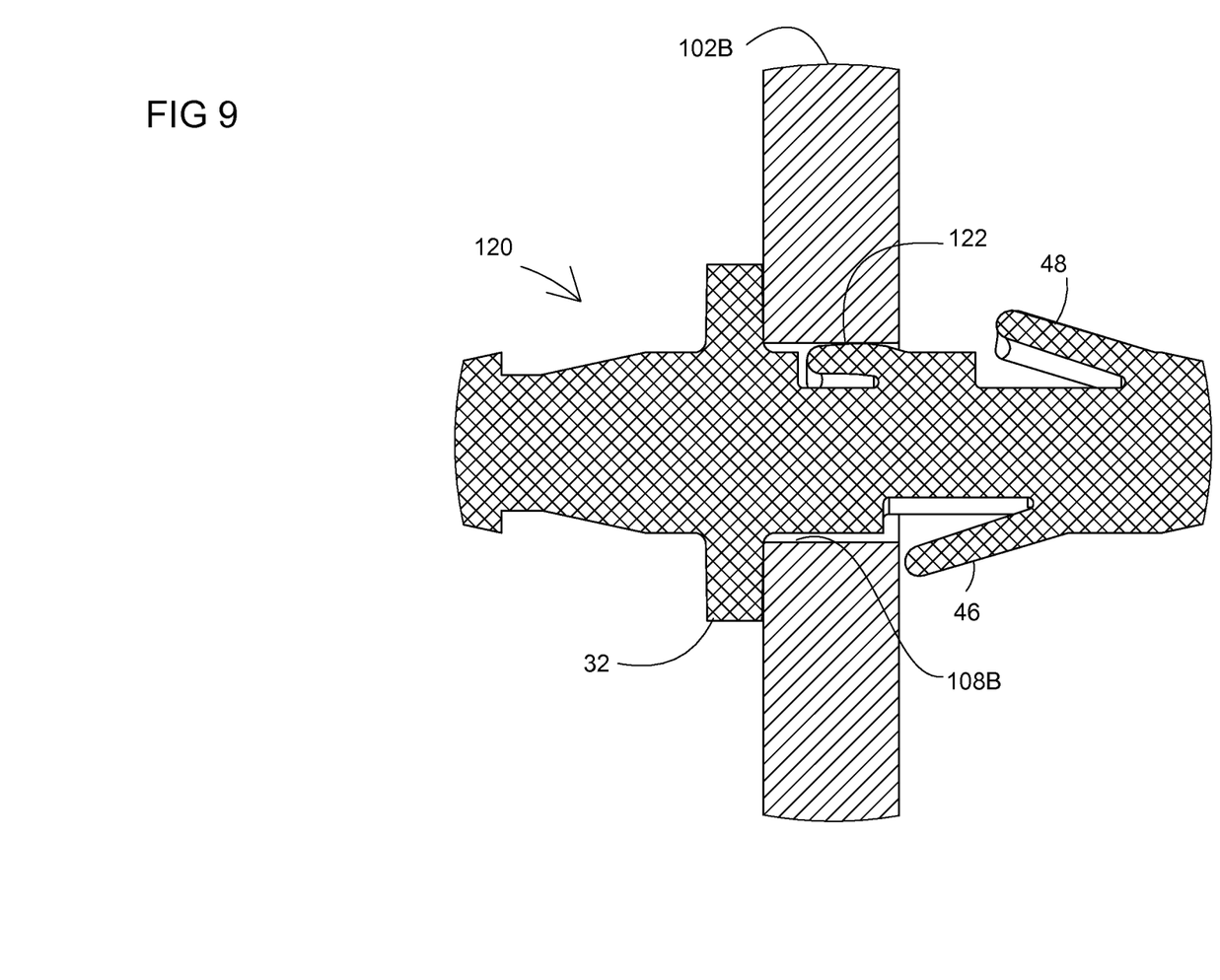
FIG. 9 is a longitudinal cross-section of a detail of part of the fastener of FIG. 7 in part of a structure into which the fastener is inserted thicker than the structure of FIG. 8.

The same fastener with the interior tongue 122 can also be used with a panel 102B thicker than the panel 102A and still achieve a reliable assembly (FIG. 9). The fastener 120 is inserted into the opening 108B of the panel until the adjacent surface of the stop wall 32 contacts the panel. In the illustrated configuration, both the first and second tongues 46 and 48, respectively, have passed completely through the opening in the panel. Additionally, the entire structure of the interior tongue 122 can be positioned interior to the panel, with a greater contact with the interior wall. The first tongue 46 limits axial movement of the lining fastener within the opening, along with the stop wall 32, and the interior tongue 122 applies a lateral load to the interior surface. With the thicker panel, relative axial movement between the lining fastener in the panel is reduced, compared to a thinner panel.

The fastener 120 can also be assembled with a thicker panel, for example 102C (FIG. 10) and still have relatively limited axial movement of the fastener in the panel, and less lateral movement within the opening compared to assemblies without an interior tongue. The fastener 120 is inserted into the opening 108C until the stop wall 32 contacts the panel. In the illustrated configuration, the second tongue 48 has passed completely through the opening and flexes outwardly beyond the rim of the opening. The interior tongue 122 is contained entirely within the opening, and at least part, and in the present example more than 50%, of the first tongue 46 is within the opening. In this configuration, two tongues contact the interior wall, and apply respective lateral loads within the opening. Therefore, the first tongue 46 can function either as an axial limit, or a structure applying a lateral load, depending on the thickness of the panel.

Figure 8:
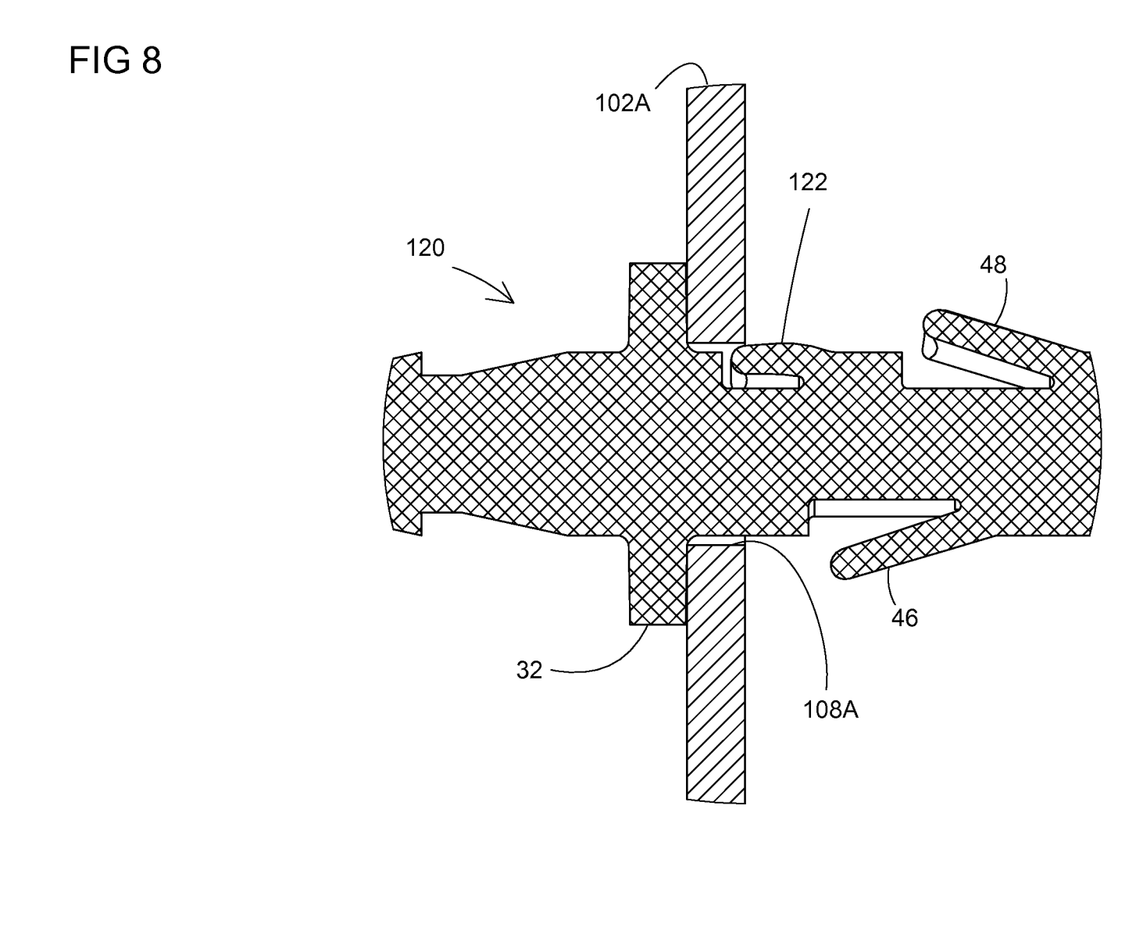
FIG. 8 is a longitudinal cross-section of a detail of part of the fastener of FIG. 7 in part of a structure into which the fastener is inserted.
Figure 10:
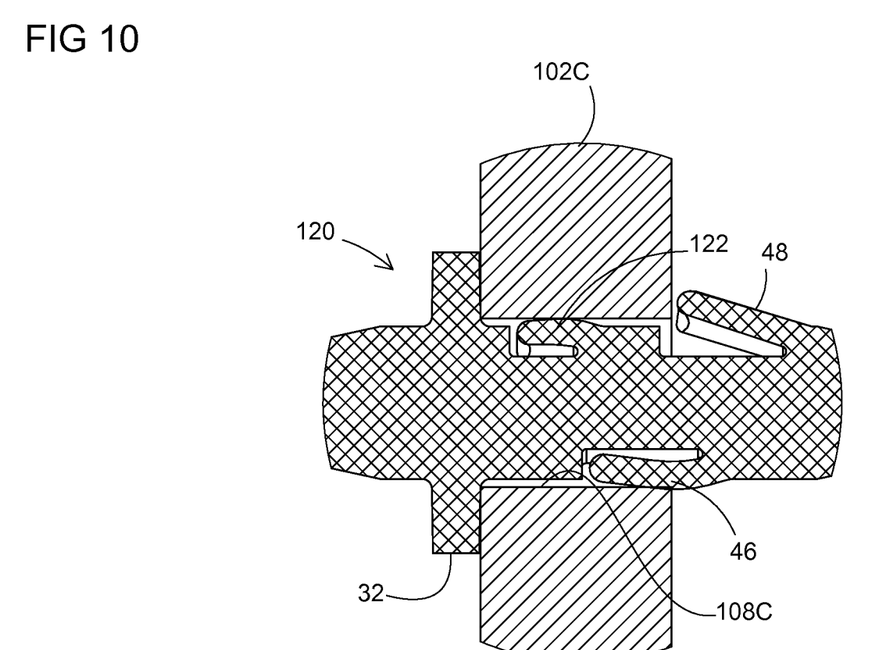
FIG. 10 is a longitudinal cross-section of a detail of part of the fastener of FIG. 7 in part of a structure into which the fastener is inserted thicker than the structure of FIG. 9.

It is understood that the configurations described with respect to FIGS. 8-10 are also applicable to a single fastener such as that described in FIGS. 1-3 configured with an interior tongue 122. In other words, the description is equally applicable to the assemblies in a fastener configuration that omits the retaining elements 84 and terminates just beyond the third tongue 48.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A monolithic plastic stud having a body extending along a longitudinal axis and having a first portion with a first end, a second portion with a second end, and a positioning element separating the first and second portions,
    wherein the first portion includes a plurality of compressible retaining elements extending radially from the longitudinal axis a radial distance, the plurality of retaining elements being shaped conically and wherein each of the plurality of retaining elements converges in a direction away from the positioning element to the body of the stud and wherein first and second retaining elements are adjacent each other and separated from each other by a cylindrical stud portion having a first diameter, and wherein at least one of the retaining elements has a smallest diameter approximately equal to the first diameter;
    first and second flexible tongues on the second portion, wherein each flexible tongue extends at an angle to the longitudinal axis in a direction away from the body of the stud toward the positioning element and configured such that a free end of the tongue is movable toward the longitudinal axis, and wherein the first and second flexibles tongues include portions axially offset from each other; and
    wherein the positioning element has a radial dimension larger than the largest radial distance of the plurality of retaining elements.

2. The stud of claim 1 wherein the first and second tongues each include respective first and second junctions at respective axial positions on the longitudinal axis, and wherein the free end of the second tongue is positioned along the longitudinal axis between the axial positions of the first junction and free end of the first tongue.

3. The stud of claim 1 wherein the first and second tongues are on diametrically opposite surfaces of the stud.

4. The stud of claim 1 wherein the first and second tongues are approximately equal in length.

5. The stud of claim 1 wherein at least one of the first and second tongues has a curved surface in a transverse cross-section.

6. The stud of claim 1 wherein the second portion includes a plurality of retaining elements.

7. The stud of claim 6 wherein the first portion includes four retaining elements and the second portion includes three retaining elements.

8. The stud of claim 6 wherein one of the first and second tongues is attached to the stud body adjacent a conical portion.

9. The stud of claim 1 wherein the first junction is less than approximately twice a distance of the second junction from the positioning element.

10. The stud of claim 1 further including a third tongue on the body between the positioning element and the first tongue.

11. The stud of claim 10 wherein the third tongue is shorter than the first tongue.

12. The stud of claim 10 wherein the third tongue overlaps the first tongue.

13. The stud of claim 1 wherein the first tongue is closer to the positioning element than the second tongue, wherein the first tongue includes a length in the axial direction extending to a free end of the first tongue, and wherein a distance between the positioning element and the free end of the first tongue is less than the length of the first tongue.

14. The stud of claim 1 wherein the first and second tongues have different lengths.

15. The stud of claim 14 wherein the first tongue is shorter than the second tongue.

16. The stud of claim 1 further including a panel enclosing the body between the positioning element and the first tongue.

17. The stud of claim 1 wherein the positioning element is a circular wall.

* * * * *